(12) United States Patent
Hintermeister et al.

(10) Patent No.: US 8,078,951 B2
(45) Date of Patent: *Dec. 13, 2011

(54) DEPTH INDICATOR FOR A LINK IN A DOCUMENT

(75) Inventors: Gregory Richard Hintermeister, Rochester, MN (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 481 days.

This patent is subject to a terminal disclaimer.

(21) Appl. No.: 12/290,431

(22) Filed: Oct. 29, 2008

(65) Prior Publication Data

US 2009/0063955 A1 Mar. 5, 2009

Related U.S. Application Data

(63) Continuation of application No. 11/149,491, filed on Jun. 9, 2005, now Pat. No. 7,490,289.

(51) Int. Cl.
*G06F 17/00* (2006.01)

(52) U.S. Cl. ..................................... 715/206

(58) Field of Classification Search .................. 715/205, 715/206

See application file for complete search history.

(56) References Cited

U.S. PATENT DOCUMENTS

| | | | | |
|---|---|---|---|---|
| 5,546,529 A * | 8/1996 | Bowers et al. | ............... | 715/848 |
| 5,877,766 A * | 3/1999 | Bates et al. | .................. | 715/854 |
| 5,987,468 A | 11/1999 | Singh et al. | | |
| 6,072,490 A * | 6/2000 | Bates et al. | .................. | 715/821 |
| 6,351,467 B1 * | 2/2002 | Dillon | ............................ | 370/432 |
| 6,381,637 B1 * | 4/2002 | Kamada | ........................ | 709/218 |
| 6,393,472 B1 | 5/2002 | Anerousis | | |
| 6,448,985 B1 | 9/2002 | McNally | | |
| 6,585,776 B1 | 7/2003 | Bates | | |
| 6,593,940 B1 * | 7/2003 | Petersen et al. | ................ | 715/700 |
| 6,640,307 B2 * | 10/2003 | Viets et al. | ........................ | 726/15 |
| 6,842,755 B2 | 1/2005 | Maslov | | |
| 7,181,734 B2 * | 2/2007 | Swamy et al. | ................. | 717/144 |
| 7,406,459 B2 * | 7/2008 | Chen et al. | ...................... | 715/205 |
| 7,861,151 B2 * | 12/2010 | Milic-Frayling et al. | ...... | 715/205 |
| 2002/0032696 A1 * | 3/2002 | Takiguchi et al. | ........... | 707/500.1 |
| 2002/0033850 A1 * | 3/2002 | Bates et al. | .................... | 345/853 |
| 2003/0172352 A1 | 9/2003 | Kashima et al. | | |
| 2004/0030741 A1 * | 2/2004 | Wolton et al. | .................. | 709/202 |

(Continued)

OTHER PUBLICATIONS

Ozgener et al., Publishing Content on the Web, Google 2005, pp. 1-6.*

(Continued)

*Primary Examiner* — Cong-Lac Huynh
(74) *Attorney, Agent, or Firm* — Owen J. Gamon

(57) ABSTRACT

A storage medium and computer that determine a tree representing links embedded in documents, create a depth indicator having a size proportional to the size of the tree, and display the depth indicator with a root link in a root document. The tree is determined by repeatedly probing the links to retrieve the documents. In various embodiments, the size of the tree may be the number of levels in the tree or the number of links in the tree. The depth indicator may include representations of the links and represents a possible future context of the root document. In various embodiments, a graphical representation of the tree may be displayed, hover help that includes the tree size may be displayed, and an indication of a condition reported by a document may be displayed. In various embodiments, the condition may include a message, updated content, new content, or an error.

12 Claims, 7 Drawing Sheets

U.S. PATENT DOCUMENTS

| | | | |
|---|---|---|---|
| 2004/0103105 | A1 | 5/2004 | Lindblad et al. |
| 2004/0199501 | A1* | 10/2004 | Okumura et al. .................. 707/3 |
| 2004/0205500 | A1 | 10/2004 | Brown et al. |
| 2004/0210829 | A1* | 10/2004 | Cristofari et al. .......... 715/501.1 |
| 2005/0050029 | A1 | 3/2005 | Suzuki |
| 2005/0086681 | A1* | 4/2005 | Ebihara et al. .................... 725/1 |
| 2005/0120292 | A1 | 6/2005 | Suzuki |
| 2005/0149873 | A1 | 7/2005 | Guido et al. |
| 2005/0154747 | A1 | 7/2005 | Kii et al. |
| 2005/0165732 | A1 | 7/2005 | Burges |
| 2005/0273730 | A1* | 12/2005 | Card et al. .................... 715/853 |
| 2006/0085765 | A1 | 4/2006 | Peterson et al. |
| 2006/0117033 | A1 | 6/2006 | Apparao et al. |
| 2006/0129569 | A1 | 6/2006 | Dieberger |
| 2006/0200375 | A1 | 9/2006 | Ohnemus et al. |
| 2006/0218135 | A1 | 9/2006 | Bisson et al. |
| 2006/0218176 | A1 | 9/2006 | Sun Hsu et al. |
| 2006/0248438 | A1* | 11/2006 | Toulemont et al. .......... 715/500 |
| 2006/0288311 | A1 | 12/2006 | Heer et al. |
| 2007/0088731 | A1 | 4/2007 | Chant et al. |
| 2007/0118806 | A1* | 5/2007 | Kondo et al. ................. 715/760 |

OTHER PUBLICATIONS

3D File System Navigator for IRIX 4.0.1+, http://www.sgi.com/fun/freeware/3d_navigator.html, 2003-2005, p. 1, Silicon Graphics.

3D File System Visualizer for Windows, http://nooface.net/articles/01/10/03/0235231.shtml, Mar. 23, 2005, pp. 1-2.

Nick Stam, Microsoft's Longhorn 3d UI—More Info Emerges, http://www.extremetech.com/article2/0,3973,1072754,00.asp, May 9, 2003, pp. 1-5. Ziff Davis Publishing Holdings Inc.

* cited by examiner

DEPTH INDICATOR FOR A LINK IN A DOCUMENT

CROSS REFERENCE TO RELATED APPLICATION

This is a continuation application of U.S. patent application Ser. No. 11/149,491, filed Jun. 9, 2005, entitled "Depth Indicator for a Link in a Document," issued as U.S. Pat. No. 7,490,289, on Feb. 10, 2009, which is herein incorporated by reference.

FIELD

This invention generally relates to computer systems and more specifically relates to a user interface with a depth indicator for an embedded link in a document.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

One of the most important developments in making computers not only more powerful, but easier to use, was the development of sophisticated user interfaces. Early computer systems were programmed with a series of switches or buttons and provided little relevant feedback during the operation of the computer system. This type of interface proved cumbersome and, accordingly, increasingly more functional and interactive interfaces were developed to extend the functionality of computer systems.

One very popular user interface, that ultimately gained widespread adoption on many different computer systems, was the "command line interface." Using a command line interface, the user interacted with the computer system by typing a specific command on a keyboard to instruct the computer regarding the desired operation to be performed. The command line interface was not intuitive, however, and still limited the use of computers to those who had the time and desire to learn a large number of relatively cryptic commands.

Recognizing the growing need for a more user-friendly interface, computer engineers and programmers developed the Graphical User Interface (GUI). A GUI uses visual representations of common items to allow a user to operate a computer system. In most GUI-based systems, various icons, symbols, menus, etc. are manipulated or activated by a computer user via a pointing device (e.g., a keyboard, mouse, trackball, touchpad, trackpad, or speech recognition device), which allows the user to give instructions to the computer. The movement of the pointing device is usually translated to the movement of an animated arrow or cursor, displayed on the computer screen. By moving the pointing device, the user can position the cursor at various locations on the computer screen. Then, by activating a button on the pointing device, the user can invoke various commands and options on the graphical user interface.

With the advent of the Internet or World Wide Web, graphical user interfaces have evolved into a style that is often called a web-based interface, where documents are linked together via hypertext. The links may be selected via the aforementioned pointing device, which causes the linked document to be retrieved and displayed. One document may contain multiple links to other documents, which in turn also contain further links, and so on indefinitely. These linked documents may be contained on the same computer or may be widely dispersed on multiple computers connected via a network.

Because a document may contain many links, and because these links may point to chains of linked documents that continue indefinitely, users may experience difficulty in knowing which link to follow. For example, one link may point to a deep chain of linked documents that provides a great deal of information while another link may point to a shallow chain of linked documents that provides comparatively little information. Further, one of the documents may provide the information in which the user is especially interested, such as an error or problem report, but the user does not know which chain to follow in order to find that document. Thus, users may spend valuable time manually following various chains of linked documents in order to find the one document of interest.

Thus, a need exists for an improved technique to show the context of linked documents.

SUMMARY

A storage medium and computer are provided that, in an embodiment, determine a tree representing links embedded in documents, create a depth indicator having a size proportional to the size of the tree, and display the depth indicator with a root link in a root document. The tree is determined by repeatedly probing the links to retrieve the documents. In various embodiments, the size of the tree may be the number of levels in the tree or the number of links in the tree. The depth indicator may include representations of the links and represents a possible future context of the root document. In various embodiments, a graphical representation of the tree may be displayed, hover help that includes the tree size may be displayed, and an indication of a condition reported by a document may be displayed. In various embodiments, the condition may include a message, updated content, new content, or an error.

BRIEF DESCRIPTION OF THE DRAWINGS

Various embodiments of the present invention are hereinafter described in conjunction with the appended drawings.

It is to be noted, however, that the appended drawings illustrate only example embodiments of the invention, and are therefore not considered limiting of its scope, for the invention may admit to other equally effective embodiments.

DETAILED DESCRIPTION

In an embodiment, in response to the display of a document having embedded links to other documents, which in turn may also have embedded links, the embedded links are probed to create a tree that represents the embedded links. A depth indicator having a size proportional to the size of the tree is also created and is displayed with its associated root link. In various embodiments, the size of the tree may be the number of levels in the tree or the number of links in the tree. The depth indicator may include representations of the links and represents a possible future context of the root document. In various embodiments, a graphical representation of the tree may be displayed, hover help that includes the tree size may be displayed, and an indication of a condition associated with a document may be displayed. In various embodiments, the condition may include a message associated with a document pointed to by an embedded link, updated content associated with a document pointed to by an embedded link, new content associated with a document pointed to by an embedded link, or an error associated with a document pointed to by an embedded link.

Figure 1:
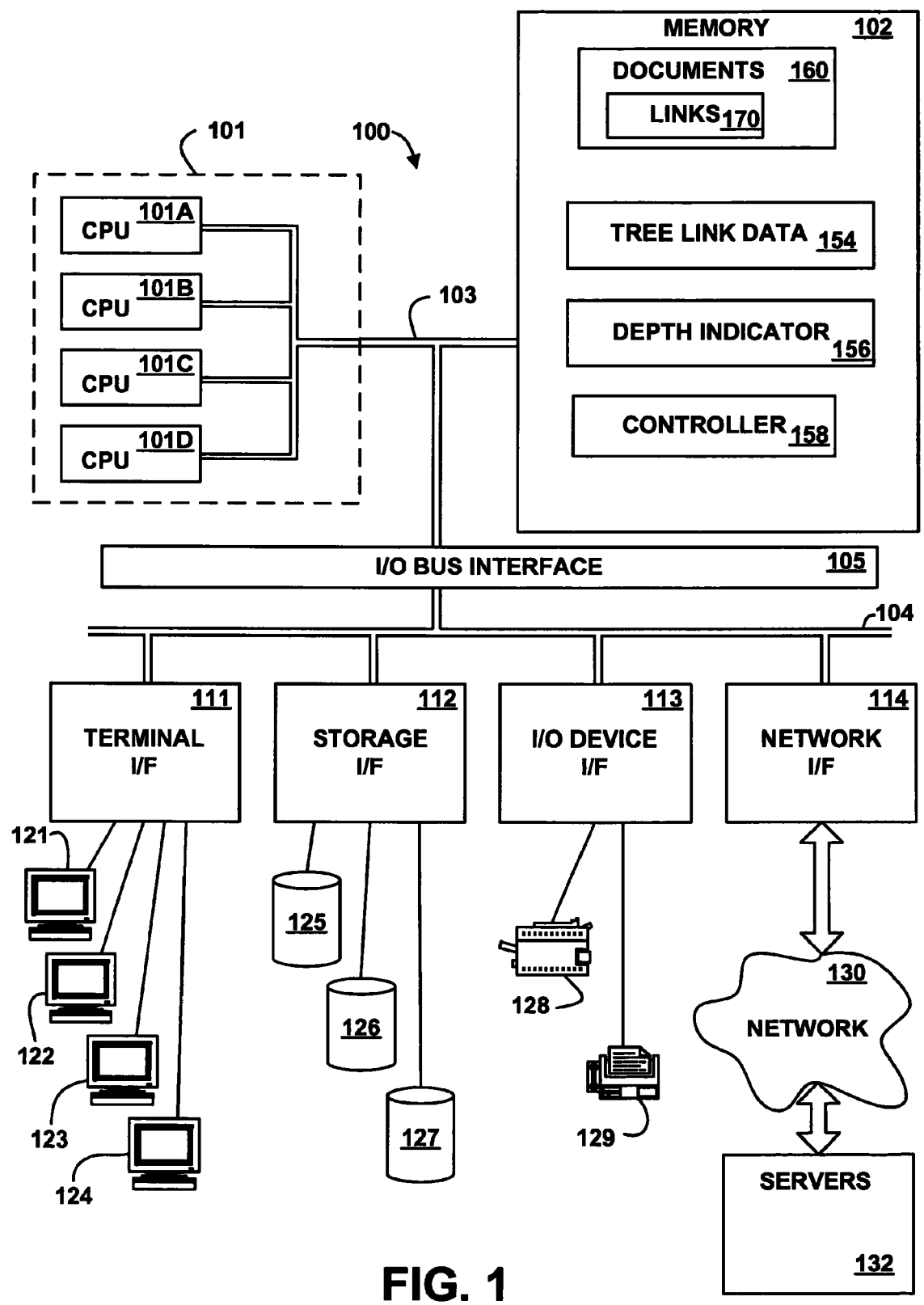
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected via a network 130 to servers 132, according to an embodiment of the present invention. The terms "computer" and "server" are used for convenience only, and an electronic device that acts as a server in one embodiment may act as a client in another embodiment, and vice versa. In an embodiment, the hardware components of the computer system 100 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, the main memory 102 may exist in multiple levels of caches, and these caches may be further divided by function, so that one cache holds instructions while another holds non-instruction data, which is used by the processor or processors. The main memory 102 may be further distributed and associated with different CPUs or sets of CPUs, as is known in any of various so-called non-uniform memory access (NUMA) computer architectures.

The main memory 102 includes tree link data 154, a depth indicator 156, a controller 158, and documents 160. Although the tree link data 154, depth indicator 156, the controller 158, and the documents 160 are illustrated as being contained within the memory 102 in the computer system 100, in other embodiments some or all of them may be on different computer systems (for example, the servers 132) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the tree link data 154, the depth indicator 156, the controller 158, and the documents 160 are illustrated as being contained within the main memory 102, these elements are not necessarily all completely contained in the same storage device at the same time. Further, although the tree link data 154, the depth indicator 156, the controller 158, and the documents 160 are illustrated as being separate entities, in other embodiments some of them, or portions of some of them, may be packaged together.

The controller 158 retrieves the documents 160 from the computer 100 or the servers 132, creates the tree link data 154, creates the depth indicator 156, and presents user interfaces based on the tree link data 154, the depth indicator 156, and the documents 160. The controller 158 includes instructions capable of executing on the processor 101 or statements capable of being interpreted by instructions executing on the processor 101 to perform the functions as further described below with reference to FIGS. 2, 3, 4, 5, 6, and 7. In another embodiment, the controller 158 may be implemented in microcode or firmware. In another embodiment, the controller 158 may be implemented in hardware via logic gates and/or other appropriate hardware techniques in lieu of or in addition to a processor-based system.

The documents 160 may include any appropriate displayable or presentable data and optional control tags or statements. Some or all of the documents 160 may further include embedded links 170, the organization of which is represented by the tree link data 154. A tree is a graphical technique for displaying or representing a hierarchical organization of linked data. A tree takes its name from an analogy to trees in nature, which have a hierarchical organization of branches and leaves. For example, a leaf is connected to a small branch, which further is connected to a large branch, and all branches of the tree have a common starting point at the root.

Analogously, the links 170 have a hierarchical organization, in that a link 170 is embedded in a document 160 and points to another document, which itself may have further embedded links, which point to still further documents, and so on. Thus, all of the links 170 and the documents 160 can be divided up into sub-groups and groups that ultimately are all pointed to by a root link.

To define a tree more formally, a tree structure defines the hierarchical organization of nodes, which can represent any data. Hence, a tree is a finite set, T, of one or more nodes, such that a) there is one specially designated node called the root of the tree; and b) the remaining nodes (excluding the root) are partitioned into m>=0 disjoint sets T1, . . . Tm, and each of these sets is in turn a tree.

The trees T1, . . . , Tm are called the subtrees of the root. Thus, every node in a tree is the root of some subtree contained in the whole tree. The number of subtrees of an node is called the degree of that node. An node of degree zero is called a terminal node or a leaf. A non-terminal node is called a branch node. The level of a node with respect to T is defined by saying that the root has level 0, and other nodes have a level that is one higher than they have with respect the subtree that contains them. Each root is the parent of the roots of its subtrees, and the latter are siblings, and they are also the children of their parent. The nodes in the subtrees of a root are the root's descendants. The root of the entire tree has no parent. Trees are represented by the tree link data 154, which is further described below with reference to FIG. 5.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support the Infiniband architecture. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

The servers 132 may include some or all of the hardware and/or software elements previously described above for the computer system 100. The servers 132 may further include some or all of the documents 160. In another embodiment, the servers 132 are optional, not present, or not used.

It should be understood that FIG. 1 is intended to depict the representative major components of the computer system 100, the network 130, and the server 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of tangible signal-bearing media, which include, but are not limited to the following computer-readable media:

(1) information permanently stored on a non-rewriteable storage medium, e.g., a read-only memory storage device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications or transmissions medium, such as through a computer or a telephone network, e.g., the network 130.

Such tangible signal-bearing media, when carrying or encoded with computer-readable, processor-readable, or machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
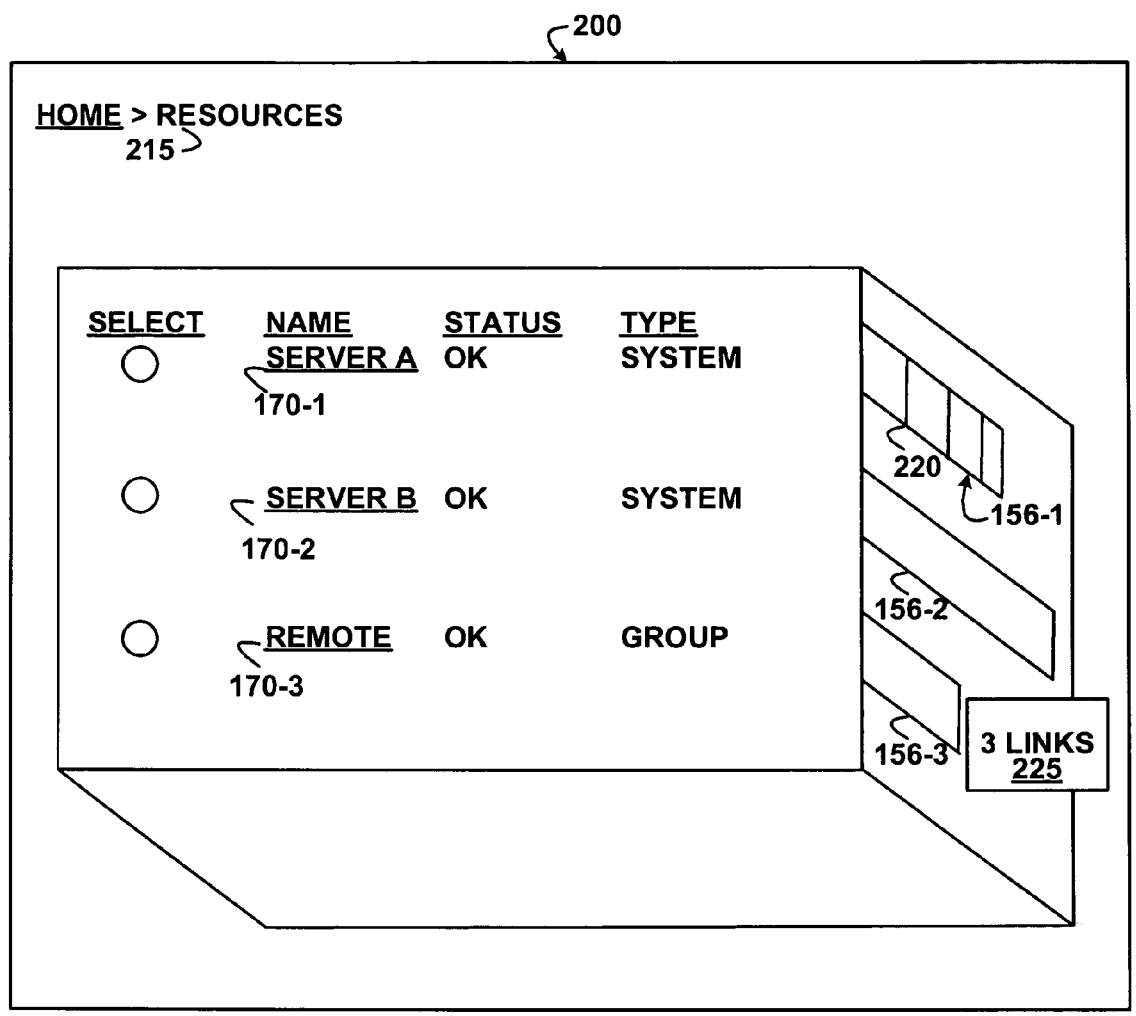
FIG. 2 depicts a block diagram of an example user interface with a depth indicator, according to an embodiment of the invention.

FIG. 2 depicts a block diagram of an example user interface 200, which may be displayed on one or all of the terminals 121, 122, 123, and/or 124, according to an embodiment of the invention. The user interface 200 includes a graphical representation of the document 160 (FIG. 1). Displayed within the user interface 200 are links 170-1, 170-2, and 170-3, which are examples of the links 170 (FIG. 1). Also illustrated within the user interface 200 are breadcrumbs 215, which indicate the historical context of the document 160. The breadcrumbs 215 provide a hierarchical path that can assist users in orienting themselves within the documents 160 that are linked to each other. They do this by providing users with additional context about where the document currently being displayed within the framework of the documents 160.

In an embodiment, the breadcrumbs 215 show the linked path within the documents 160 that a user might typically take to access the current document if the user were to start from the homepage of a web site. The breadcrumbs 215 may, but do not necessarily, follow a directory structure within a web site. In other words, the breadcrumbs 215 represent how the user might view the structure of the web site represented by the documents 160, and not how the directories are physically structured within the computer 100. The breadcrumbs 215 provide a single hierarchical path, but multiple paths to access a specific document may exist. In another embodiment, the breadcrumbs 215 show the actual path of links 170 that the user took in order to arrive at the current document illustrated in the user interface 200. The user may request navigation to any of the documents illustrated within the breadcrumbs 215 by selecting its respective link.

Also illustrated within the user interface 200 are depth indicators 156-1, 156-2, and 156-3, associated with the link 170-1, the link 170-2, and the link 170-3, respectively. The depth indicators 156-1, 156-2, and 156-3 are all examples of the depth indicator 156 (FIG. 1). In contrast to the breadcrumbs 215, the depth indicators 156-1, 156-2, and 156-3 represent possible future contexts for the currently displayed document that may be experienced by following each of the respective links 170-1, 170-2, and 170-3. Thus, each of the depth indicators 156-1, 156-2, and 156-3 represent respective trees, which are stored as respective tree link data 154. Further, each of the links 170-1, 170-2, and 170-3 is a root link of its respective tree, meaning that each of the links 170-1, 170-2, and 170-3 is represented by a root node in its respective tree, represented by the respective depth indicators 156-1, 156-2, and 156-3.

The size of each of the depth indicators 156-1, 156-2, and 156-3 is proportional to the size of its respective tree. In an embodiment, the size of a tree is the number of levels in the tree. In another embodiment, the size of the tree is the number of the links (the number of the nodes) in the tree.

The depth indicator 156-1 includes hot links 220, which are representations of the links in the tree represented by the depth indicator 156-1, and the user may request navigation to, or retrieval of, a document by selecting its associated hotlink 220. Although only the depth indicator 156-1 is illustrated as including the hot links 220, in other embodiments, any or all of the depth indicators 156 may include hot links. Associated with the depth indicator 156-3 is hover help 225, which indicates the number of links (the number of nodes) in the tree represented by the depth indicator 156-3. The controller 158 displays the hover help 225 in response to a pointing device passing over or near the associated depth indicator 156-3. Any of the depth indicators 156 may have associated hover help.

Figure 3:
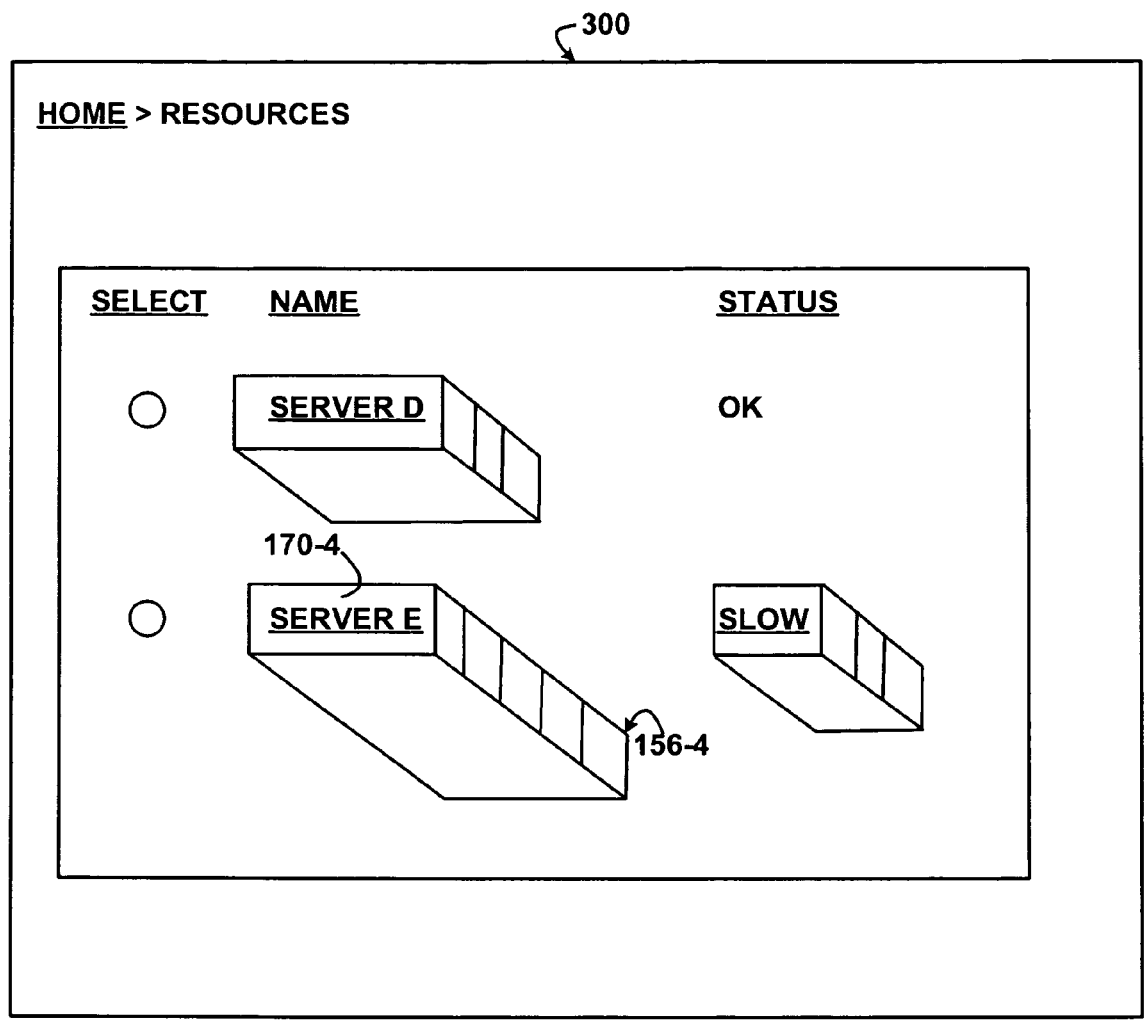
FIG. 3 depicts a block diagram of an example user interface with depth indicators on a per-link basis, according to an embodiment of the invention.

FIG. 3 depicts a block diagram of an example user interface 300 with depth indicators on a per-link basis, according to an embodiment of the invention. The example user interface 300 includes an example display of the document 160 (FIG. 1). The depth indicator 156-4 is displayed adjacent to and is associated with the link 170-4. The depth indicator 156-4 represents the tree for which the link 170-4 is the root link. The depth indicator 156-4 is an example of the depth indicator 156 (FIG. 1). The link 170-4 is an example of the link 170 (FIG. 1).

Figure 4:
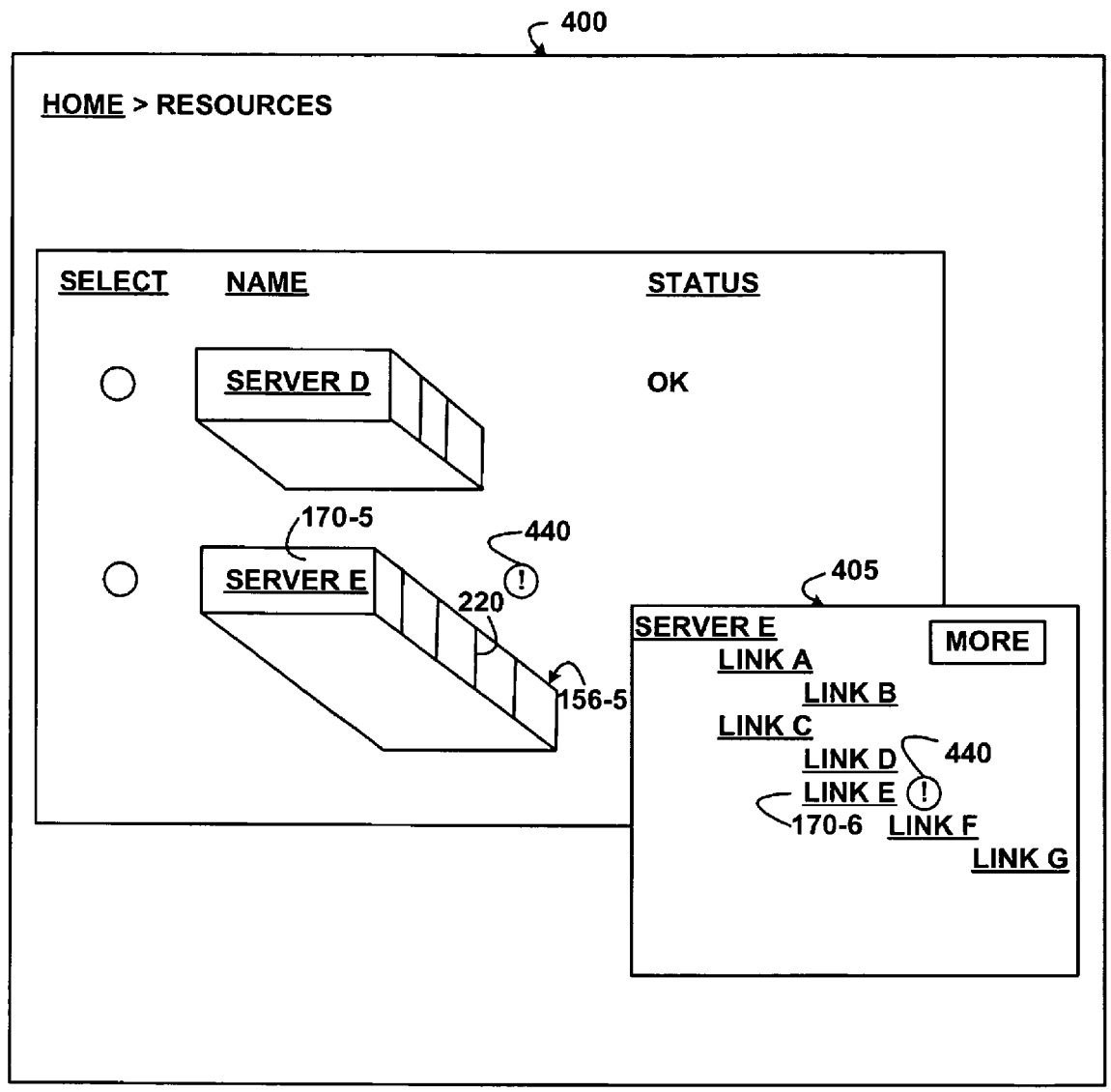
FIG. 4 depicts a block diagram of an example user interface with a graphical representation of tree link data, according to an embodiment of the invention.

FIG. 4 depicts a block diagram of an example user interface 400, according to an embodiment of the invention. The example user interface 400 includes an example display of the document 160 (FIG. 1). The example user interface 400 further includes a depth indicator 156-5, which is displayed adjacent to and is associated with the link 170-5. The depth indicator 156-5 represents the tree for which the link 170-5 is the root link. The depth indicator 156-5 is an example of the depth indicator 156 (FIG. 1). The link 170-5 is an example of the link 170 (FIG. 1).

The example user interface 400 further includes a graphical representation 405 of the tree link data 154 (FIG. 1). The graphical representation 405 represents the tree for which the link 170-5 is the root link. Although the graphical representation 405 includes the root link ("server e" in the illustrated example), in another embodiment, the graphical representation 405 may represent a subtree, in which case the root link is not displayed in the graphical representation 405.

The example user interface 400 further includes an indication 440, which represents a condition associated with one of the documents 160 that is pointed to by the link 170-6 illustrated in the graphical representation 405 of the link data 154. The link 170-6 is an example of the link 170 (FIG. 1). In various embodiments, the indication 440 may be displayed within the graphical representation 405 adjacent to its associated link, or may be displayed adjacent to its associated hot link 220 in the associated depth indicator 156-5. In various embodiments, the condition may include an error associated with the document pointed to by the link, a message waiting associated with the document pointed to by the link, new content associated with the document pointed to by the link, or updated content associated with the document pointed to by the link.

The user interface elements and data illustrated in FIGS. 2, 3, and 4 are examples only, and in other embodiments any appropriate user interface elements and data may be used. For example, although the depth indicators 156 are illustrated in perspective as having a depth downwards in three dimensions, in other embodiments they may be illustrated in two dimensions, or they may have a height upwards.

Figure 5:
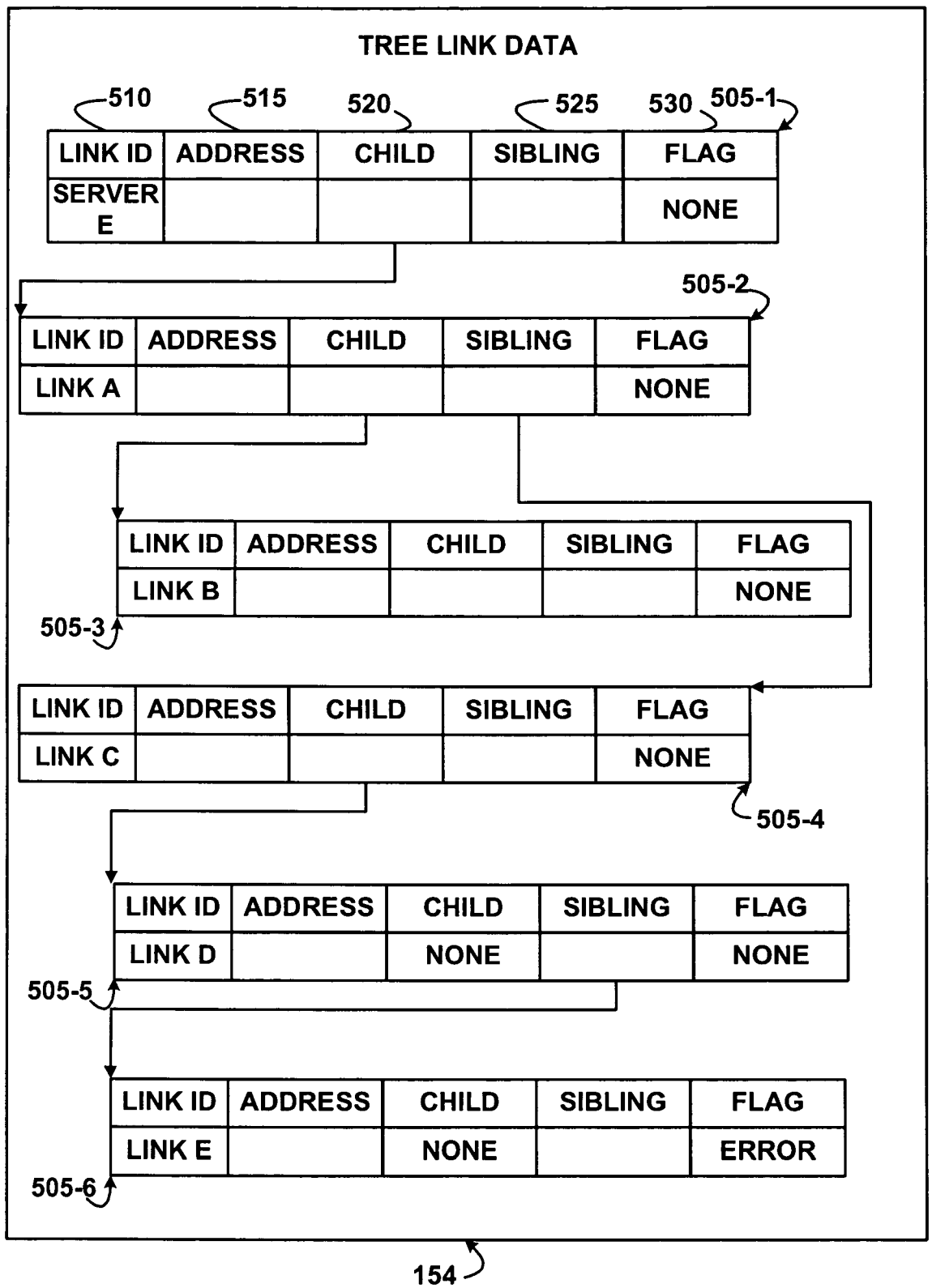
FIG. 5 depicts a block diagram of example tree link data, according to an embodiment of the invention.

FIG. 5 depicts a block diagram of example tree link data 154, according to an embodiment of the invention. The example tree link data 154 includes records 505-1, 505-2, 505-3, 505-4, 505-5, and 505-6, but in other embodiments any number of records with any appropriate data may be present. Each of the records 505-1, 505-2, 505-3, 505-4, 505-5, and 505-6 represents a node in a tree associated with the depth indicator 156. Each of the records includes a link identifier field 510, and address field 515, a child field 520, a sibling field 525, and a flag field 530.

The link identifier field 510 identifies one of the links 170. The record 505-1 represents the root node of the tree and the link identifier 510 in the record 505-1 is the root link.

The address field 515 indicates the address to which the link identifier field 510 points. For example, the address field 515 may contain a universal resource locator (URL) or any other appropriate address. A URL may include, for example, the domain name, the directory, and subdirectory structure where the document 160 is located.

The child field 520 points to a child record. For example, the record 505-2 is the child of the record 505-1 because the child field 520 in the record 505-1 points to the record 505-2.

The sibling field 525 points to a sibling record. For example, the record 505-4 is a sibling of the record 505-2 because the sibling field in the record 505-2 points to the record 505-4. In another embodiment, the sibling field 525 is not present or not used, and the child field 520 points to any and all child records of the record containing the child field 520.

The flag field 530 indicates a condition associated with the document to which the address field 515 points. For example, the flag field 530 may indicate that the document reports an error, has a message waiting, or has new or updated content. But in other embodiments, any appropriate condition may be indicated in the flag field 530.

Figure 6:
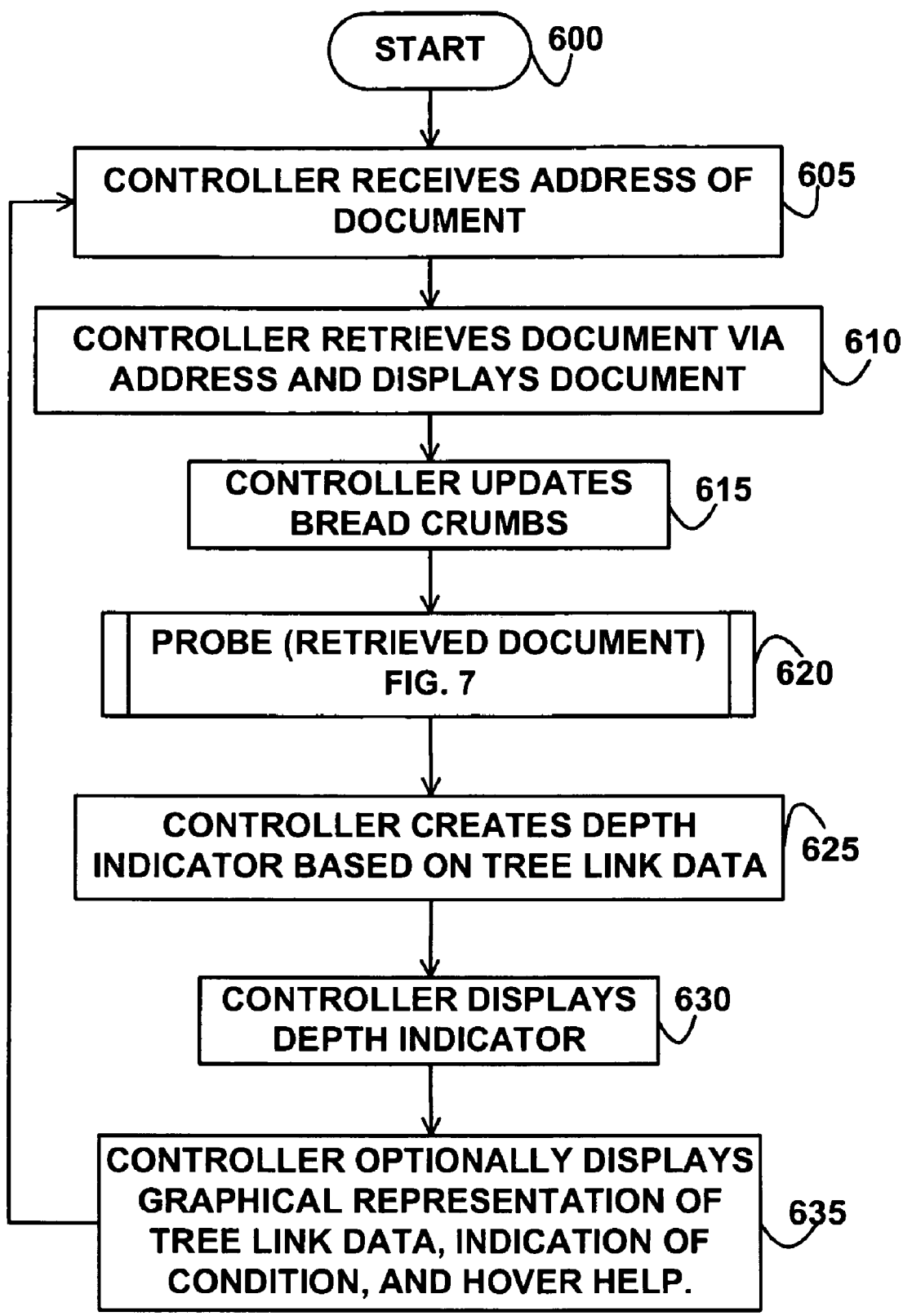
FIG. 6 depicts a flowchart of example processing for creating the depth indicator and the tree link data, according to an embodiment of the invention.

FIG. 6 depicts a flowchart of example processing for creating the depth indicator 156 and the tree link data 154, according to an embodiment of the invention. Control begins at block 600. Control then continues to block 605 where the controller 158 receives an address of the document 160. In various embodiments, the controller 158 may receive the address from selection of an entry in a browser favorites or bookmark list, from selection of the hot link 220, from selection of an entry in the breadcrumbs 215, from selection of a link in the graphical representation 405, from selection of the root links 170-1, 170-2, 170-3, 170-4, or 170-5, from an address entered by a user or a program, or by any other appropriate technique.

Control then continues to block 610 where the controller 158 retrieves the document 160 via the address and displays the document, for example on one or more of the terminals 121, 122, 123, or 124, as previously described above in the examples of FIGS. 2, 3, and 4.

Control then continues to block 615 were the controller 158 updates the bread crumbs 215 to indicate the historical context of the document 160, as previously described above with reference to FIG. 2. Control then continues to block 620 where the controller 158 probes the retrieved document 160, as further described below with reference to FIG. 7. Control then continues to block 625 where the controller 158 creates the depth indicator 156 based on the tree link data 154. Control then continues to block 630 where the controller 158 displays the depth indicator 156, as previously described above with reference to FIGS. 2, 3, and 4. Control then continues to block 635 where the controller 158 optionally displays the graphical representation 405 of the tree link data 154, the indication 440 of the condition (if indicated in the flag 530), and/or the hover help 225, as previously described above with reference to FIGS. 2, 4, and 5. Control then returns to block 605, as previously described above.

Figure 7:
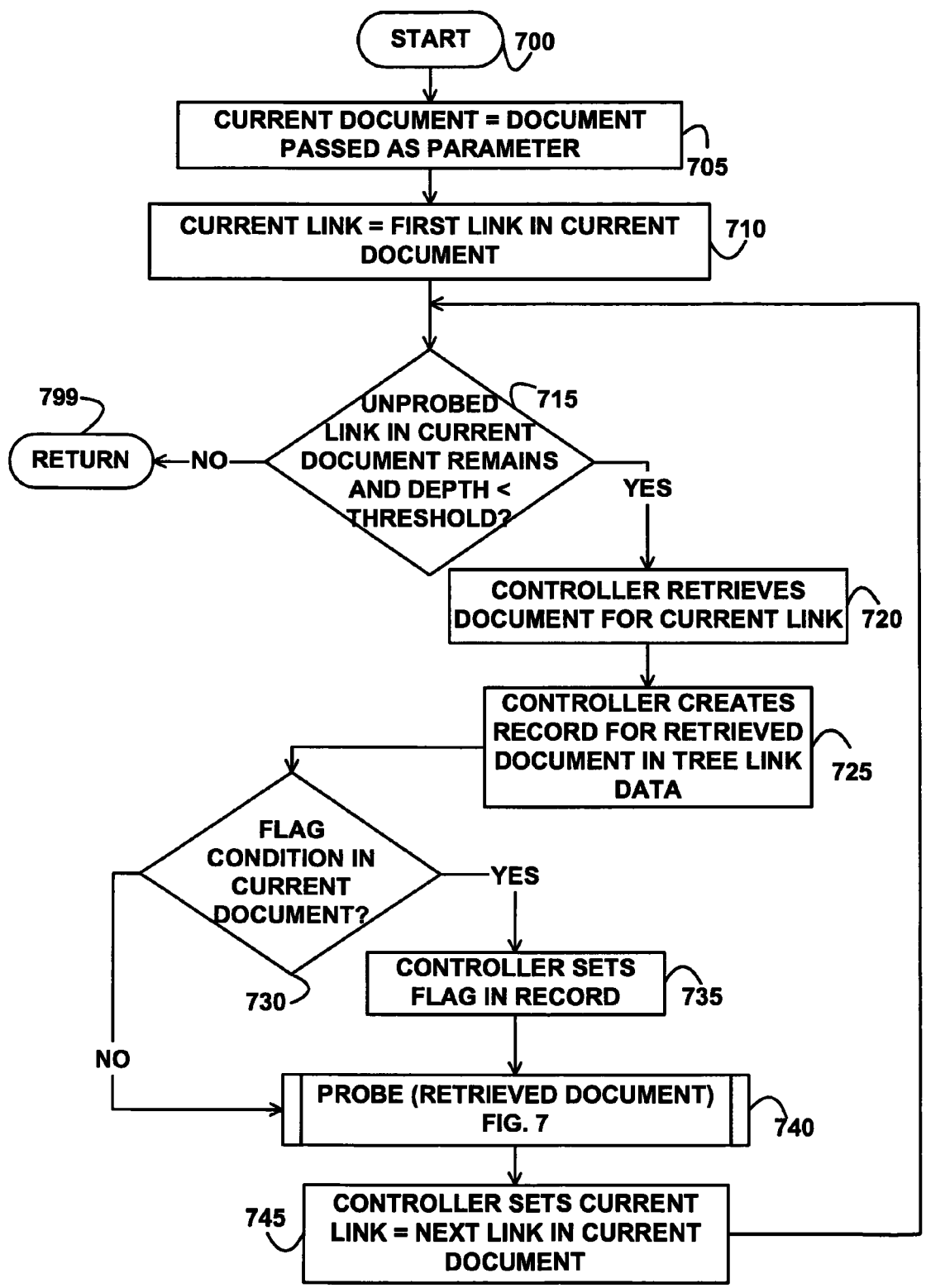
FIG. 7 depicts a flowchart of example processing for probing links in a document, according to an embodiment of the invention.

FIG. 7 depicts a flowchart of example processing for probing the links 170 in the documents 160, according to an embodiment of the invention. Control begins at block 700. Control then continues to block 705 where the controller 158 sets the current document to be the document passed as a parameter to the logic of FIG. 7. Control then continues to block 710 where the controller 158 sets the current link to be the first link in the current document. Control then continues to block 715 where the controller 158 determines whether an unprobed link in the current document exists and whether the probed depth of the tree represented by the tree link data 154 is less than a threshold. In an embodiment, the probed depth may be a count of the total number of links followed (the total number of documents retrieved). In the example of FIG. 4, the total number of links followed is eight, representing the total number of links in the graphical representation 405. In another embodiment, the probed depth may be the maximum number of levels in the tree, which in the example of FIG. 4 is four (server E is level zero, link C is level one, link E is level two, link F is level three, and link G is level four). A link is unprobed by the logic of FIG. 4 if the address of the document to which the link points is not already represented in the address field 515 of a record in the tree link data 154.

If the determination of block 715 is true, then an unprobed link in the current document does exist and the probed depth is less than the threshold, so control continues to block 720 where the controller 158 retrieves the document for the current link. Control then continues to block 725 where the controller 158 creates a record for the retrieved document in the tree link data 154, as previously described above with reference to FIG. 5, including setting the link identifier field 510, the address field 515, the child field 520, and the sibling field 525 of the newly created record and updating the child field 520 and the sibling field 525 of any pre-existing records in the tree link data 154.

Control then continues to block 730 where the controller 158 determines whether a condition exists in the retrieved document. In various embodiments, examples of conditions include the document reporting an error, the document reporting a message waiting, the document reporting that new hardware or software has been installed or updated, or any other appropriate condition. If the determination at block 730 is true, then a condition does exist in the retrieved document, so control continues to block 735 where the controller 158 sets the flag 530 in the created record in the tree link data 154 to reflect the indicated condition. Control then continues to block 740 where the controller 158 recursively probes the retrieved document using the logic of FIG. 7 and passing the retrieved document as a parameter. Control then continues to block 745 where the controller 158 sets the current link to be the next link in the current document. Control then returns to block 715, as previously described above.

If the determination of block 730 is false, then a condition does not exist in the current document, so control continues from block 730 to block 740, as previously described above.

If the determination of block 715 is false, then either all links in the current document have been probed, or the probed depth exceeds the threshold, so control continues from block 715 to block 799 where the logic of FIG. 7 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

What is claimed is:

1. A storage medium encoded with instructions, wherein the instructions when executed comprise:
   determining a tree representing a plurality of links, wherein the plurality of links are embedded in a plurality of documents, wherein each of the plurality of links points to a respective one of the plurality of documents, and wherein the determining further comprises probing the plurality of links, starting with a root link of the plurality of links;
   creating a depth indicator, wherein a size of the depth indicator is proportional to a size of the tree, wherein the size of the tree comprises a total number of the plurality of links in the tree, wherein the creating the depth indicator further comprises creating representations of the plurality of links in the depth indicator; and
   displaying the depth indicator associated with the root link in a root document of the plurality of documents.

2. The storage medium of claim 1, wherein the determining is performed in response to a display of the root document.

3. The storage medium of claim 1, further comprising:
   in response to selection of one of the representations of the plurality of links in the depth indicator, retrieving the associated document.

4. The storage medium of claim 1, further comprising:
   displaying hover help comprising the total number of the plurality of links in the tree in the tree represented by the depth indicator, in response to a pointing device passing over the depth indicator.

5. The storage medium of claim 1, further comprising:
   determining that one of the plurality of documents comprises a condition.

6. The storage medium of claim 5, further comprising:
   displaying an indication of the condition.

7. A computer comprising:
   a processor; and
   memory connected to the processor, wherein the memory is encoded with instructions, wherein the instructions when executed on the processor comprise:
      determining a tree representing a plurality of links, wherein the plurality of links are embedded in a plurality of documents, wherein each of the plurality of links points to a respective one of the plurality of documents, and wherein the determining further comprises probing the plurality of links, starting with a root link of the plurality of links,
      creating a depth indicator, wherein a size of the depth indicator is proportional to a size of the tree, wherein the size of the tree comprises a total number of the plurality of links in the tree, wherein the creating the depth indicator further comprises creating representations of the plurality of links in the depth indicator, and
      displaying the depth indicator associated with the root link in a root document of the plurality of documents.

8. The computer of claim 7, wherein the determining is performed in response to a display of the root document.

9. The computer of claim 7, wherein the instructions further comprise:
   in response to selection of one of the representations of the plurality of links in the depth indicator, retrieving the associated document.

10. The computer of claim 7, wherein the instructions further comprise:
  displaying hover help comprising the total number of the plurality of links in the tree in the tree represented by the depth indicator, in response to a pointing device passing over the depth indicator.

11. The computer of claim 7, wherein the instructions further comprise:
  determining that one of the plurality of documents comprises a condition.

12. The computer of claim 11, wherein the instructions further comprise:
  displaying an indication of the condition.

* * * * *